US008564404B2

(12) United States Patent
Tanaka et al.

(10) Patent No.: US 8,564,404 B2
(45) Date of Patent: Oct. 22, 2013

(54) FRANCHISE ADD-ON SYSTEM, USER OPERATION TERMINAL AND STORE FRONT STOCK SHELF AND BACKYARD STOCK SHELF USED THEREFOR, AND COMPUTER PROGRAM USED THEREFOR

(75) Inventors: Masataka Tanaka, Hyogo (JP); Hiroshi Watanabe, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 451 days.

(21) Appl. No.: 12/935,453

(22) PCT Filed: Mar. 18, 2009

(86) PCT No.: PCT/JP2009/001198
§ 371 (c)(1),
(2), (4) Date: Sep. 29, 2010

(87) PCT Pub. No.: WO2009/122663
PCT Pub. Date: Oct. 8, 2009

(65) Prior Publication Data

US 2011/0018685 A1 Jan. 27, 2011

(30) Foreign Application Priority Data

Mar. 31, 2008 (JP) ................................ 2008-089516

(51) Int. Cl.
*G05B 23/00* (2006.01)

(52) U.S. Cl.
USPC ........................................................ 340/5.91

(58) Field of Classification Search
USPC .......................... 340/5.91, 571, 572.1, 10.42
See application file for complete search history.

(56) References Cited

U.S. PATENT DOCUMENTS 6,269,342 B1 * 7/2001 Brick et al. .................... 705/20
7,213,753 B2 5/2007 Barton et al.
2003/0182193 A1 * 9/2003 Kawamata ...................... 705/16
2004/0199432 A1 10/2004 Iwase et al.

FOREIGN PATENT DOCUMENTS

| | | | |
|---|---|---|---|
| JP | 5-94592 | A | 4/1993 |
| JP | 7-320153 | A | 12/1995 |
| JP | 11-86135 | A | 3/1999 |
| JP | 2000-155825 | A | 6/2000 |
| JP | 2001-338345 | A | 12/2001 |
| JP | 2002-329252 | A | 11/2002 |
| JP | 2004-303228 | A | 10/2004 |
| JP | 2006-92384 | A | 4/2006 |
| JP | 2006-129268 | A | 5/2006 |
| JP | 2007-172143 | A | 7/2007 |

* cited by examiner

*Primary Examiner* — Vernal Brown
(74) *Attorney, Agent, or Firm* — Birch, Stewart, Kolasch & Birch, LLP

(57) ABSTRACT

A store front stock shelf 300 installed together with a sales processing device 200 at a position of cash register detects a stock status of cigarette packs STP housed therein, and produces store front stock data SSD. A user operation terminal 100 installed together with the sales processing device 200 at the position of cash register acquires, from the store front stock shelf 300, store front stock data SSD of cigarette packs STP selected on the commodity selection screen TSG displayed in a switchable manner in response to enter operation by the ordinary user, and makes the touch panel display, in a switchable manner, a commodity selection screen TSG presenting "in stock" if the cigarette packs STP are in stock. In this way, a franchise add-on system capable of simplifying and smoothening purchase of even over-the-counter commodities not readily accessible by the ordinary users, such as cigarette packs STP, and capable of improving LTV and retention, can be provided.

19 Claims, 7 Drawing Sheets

FRANCHISE ADD-ON SYSTEM, USER OPERATION TERMINAL AND STORE FRONT STOCK SHELF AND BACKYARD STOCK SHELF USED THEREFOR, AND COMPUTER PROGRAM USED THEREFOR

TECHNICAL FIELD

The present invention relates to a franchise add-on system used at franchise shops where over-the-counter commodities attached with commodity ID (identification) data are sold to ordinary consumers, a user operation terminal, a store front stock shelf and a backyard stock shelf, and a computer program used therefor.

BACKGROUND ART

At present, at franchise shops such as so-called convenience stores, store front stock shelf typically called store fixtures are installed in so-called commodity sales floor. Typically at a position of so-called cash register, a sales processing device called POS (Point Of Sales) terminal or electronic cash register, is installed.

In this configuration, an ordinary user (consumer) picks up a desired over-the-counter commodity from the store front stock shelf, brings it to a position of cash register, and a shop clerk executes sales processing of the over-the-counter commodity by using the sales processing device.

Such the sales processing device executes the sales processing based on a commodity ID data attached to each of the over-the-counter commodities. More specifically, a general sales processing device includes a keyboard unit and/or a barcode reader.

On the other hand, each over-the-counter commodity has a JAN (Japanese Article Number) code, which is the commodity ID data, placed thereon in a form of barcode image and a text of numerical sequence.

Then, the commodity ID data is entered into the sales processing device, by allowing the barcode reader to optically read the barcode image, or by entering the numerical sequence through the keyboard unit.

In general franchise shops, a backyard stock shelf is installed in the backyard apart from the position of cash register. The backyard stock shelf keeps the over-the-counter commodities to be replenished to the store front stock shelf.

Therefore, when the shop clerk finds that the over-the-counter commodities are out of stock, or only a few of them are in stock on the store front stock shelf, the shop clerk replenishes the over-the-counter commodities from the backyard stock shelf to the store front stock shelf.

By the way, a part of the over-the-counter commodities, such as cigarette packs, is housed in the store front stock shelf disposed in the vicinity of the sales processing device at the position of the cash register on the counter, so as to make it not readily accessible by the ordinary users. Accordingly, the ordinary user who wants to buy such over-the-counter commodity orally indicates an order of purchase to the shop clerk at the position of cash register.

Various proposals have been made aiming at assisting commodity sales at the above-described franchise shops (see Patent Documents 1 to 5, for example).

[Patent Document 1] Japanese Laid-Open Patent Publication No. 2006-129268

[Patent Document 2] Japanese Laid-Open Patent Publication No. 2004-303228

[Patent Document 3] Japanese Laid-Open Patent Publication No. 2006-092384

[Patent Document 4] Japanese Laid-Open Patent Publication No. 2001-338345

[Patent Document 5] Japanese Laid-Open Patent Publication No. H11-086135

DISCLOSURE OF THE INVENTION

However, since the over-the-counter commodities described in the above, such as cigarette packs, are housed in the store front stock shelf at the position of cash register on the counter, which are not readily accessible by the ordinary users, so that it is difficult for the ordinary users to confirm presence or absence of the stock.

Accordingly, there may be a case where the shop clerk notices out-of-stock of the commodities only after the ordinary user orally indicates an order. In this case, for example, the shop clerk has to move to the backyard, to confirm whether the stock is available in the backyard stock shelf or not.

However, this makes the ordinary user to be waited for a long time even if the stock is available. If the stock is not available, not only the ordinary user is wastefully kept waiting, but also the labor by the shop clerk is wasteful. In this case, the ordinary user may be offended, and sales of the over-the-counter commodities may consequently be inhibited.

For this reason, about the over-the-counter commodities not readily accessible by the ordinary users as described in the above, they idly degrade especially the LTV (Life Time Value) and retention.

The present invention is conceived after considering the above-described problems, the purpose of which is to provide a franchise add-on system which allows more simplified and quick purchase of commodities not readily accessible by the ordinary users, such as cigarette packs, and thereby improves the LTV and retention, and also to provide a user operation terminal, a store front stock shelf and a backyard stock shelf, and a computer program used therefor.

According to the present invention, there is provided a franchise add-on system including a sales processing device which is installed at a position of cash register in a franchise shop so as to execute sales processing of over-the-counter commodities by commodity ID data attached to the over-the-counter commodity, including: a store front stock shelf installed in the vicinity of the sales processing device at the position of cash register, and housing at least a part of the over-the-counter commodities in a freely pickable manner; and a user operation terminal which includes a touch panel allowing thereon enter operation by an ordinary user, and installed in the vicinity of the sales processing device at the position of cash register. The store front stock shelf includes a stock detection unit which detects a stock status of the over-the-counter commodities housed therein and produces store front stock data, the user operation terminal includes a media storage unit which stores a hypermedia which makes the user operation terminal output, in a displayed form, a commodity selection screen allowing thereon step-wise selection among the over-the-counter commodities housed in at least the store front stock shelf, in response to the enter operation by the ordinary user; a media display unit which makes the touch panel display, in a switchable manner, the stored commodity selection screen in response to the enter operation by the ordinary user; and a stock confirmation unit which makes use of the commodity ID data of the over-the-counter commodity selected on the commodity selection screen displayed in a switchable manner, so as to acquire a correspondent store front stock data from the store front stock shelf, and the media display unit makes the touch panel display, in a switchable manner, the commodity selection screen presenting “in stock”, if the acquired store front stock data represents an in-stock status.

Accordingly, in the franchise add-on system of the present invention, at least a part of the over-the-counter commodities is stored in the store front stock shelf installed in the vicinity of the sales processing device at the position of cash register, in a freely pickable manner. In addition, the user operation terminal including the touch panel which allows thereon the ordinary user to make enter operation, is installed in the vicinity of the sales processing device at the position of cash register. The stock detection unit of the store front stock shelf detects a stock status of the over-the-counter commodities housed therein and produces store front stock data. The media storage unit of the user operation terminal stores a hypermedia which makes the user operation terminal output, in a displayed form, a commodity selection screen allowing thereon step-wise selection among the over-the-counter commodities housed in at least the store front stock shelf, in response to the enter operation by the ordinary user. In this state, the media display unit makes the touch panel display, in a switchable manner, the stored commodity selection screen of the hypermedia in response to the enter operation by the ordinary user. The stock confirmation unit makes use of the commodity ID data of the over-the-counter commodities selected on the commodity selection screen displayed in a switchable manner, so as to acquire a correspondent store front stock data from the store front stock shelf. The media display unit makes the touch panel display, in a switchable manner, the commodity selection screen presenting “in stock”, if the acquired store front stock data represents an in-stock status. Accordingly, since the stock status of the over-the-counter commodities, even such as cigarette packs disposed at the position of cash register and are therefore not readily accessible by the ordinary users, may be reported to the ordinary user in a simple and exact manner, so that the over-the-counter commodities may be purchased in a simple and quick manner, and thereby the LTV and retention may be improved.

In the above-described franchise add-on system, the media display unit may make the touch panel display, in a switchable manner, the commodity selection screen presenting “out-of-stock”, if the acquired store front stock data represents an out-of-stock status.

Moreover, in the above-described franchise add-on system, the media display unit may make the touch panel display, in a switchable manner, the commodity selection screen recommending a correlated one of the over-the-counter commodities, if the acquired store front stock data represents an out-of-stock status.

Moreover, the above-described franchise add-on system may further include a backyard stock shelf which is installed in a backyard of the franchise shop apart from the position of cash register, so as to keep the over-the-counter commodities to be replenished to the store front stock shelf. The backyard stock shelf including a replenishment detection unit which detects a stock status of the over-the-counter commodities kept therein and produces replenishment stock data. The user operation terminal may further include a replenishment confirmation unit which makes use of the commodity ID data to acquire a correspondent the replenishment stock data from the backyard stock shelf, if the acquired store front stock data represents an out-of-stock status. The media display unit may make the touch panel display, in a switchable manner, the commodity selection screen presenting “out-of-stock”, if also the acquired replenishment stock data represents an out-of-stock status.

Moreover, in the above-described franchise add-on system, the media display unit may make the touch panel display, in a switchable manner, the commodity selection screen presenting “in-stock”, if the acquired store front stock data represents an out-of-stock status and the replenishment stock data represents an in-stock status.

Moreover, in the above-described franchise add-on system, the media display unit may make the touch panel display, in a switchable manner, the commodity selection screen recommending a correlated one of the over-the-counter commodities, if both of the acquired store front stock data and the replenishment stock data represent an out-of-stock status.

Moreover, in the above-described franchise add-on system, at least either one of the user operation terminal and the backyard stock shelf may include an alert sending unit which sends, if the store front stock data represents an out-of-stock status and the replenishment stock data represents an in-stock status, the correspondent commodity ID data together with a predetermined replenishment alert data to the sales processing device. The sales processing device may include an alert receiving unit which receives the replenishment alert data and the commodity ID data, and an alert issuing unit which outputs, in an alert form, the received replenishment alert data and the commodity ID data.

Moreover, in the above-described franchise add-on system, at least either one of the user operation terminal and the backyard stock shelf may include a purchase alert unit which sends, if the replenishment stock data represents an out-of-stock status, the correspondent commodity ID data together with a predetermined purchase alert data to the sales processing device. The sales processing device may include an alert receiving unit which receives the purchase alert data and the commodity ID data, and an alert issuing unit which outputs, in an alert form, the received purchase alert data and the commodity ID data.

Moreover, in the above-described franchise add-on system, at least either one of the user operation terminal and the backyard stock shelf may include an alert sending unit which sends, if the store front stock data represents an out-of-stock status, the correspondent commodity ID data together with a predetermined replenishment alert data to the sales processing device. The sales processing device may include an alert receiving unit which receives the replenishment alert data and the commodity ID data, and an alert issuing unit which outputs, in an alert form, the received replenishment alert data and the commodity ID data.

Moreover, in the above-described franchise add-on system, the user operation terminal may further include an ID presenting unit which outputs, if the acquired store front stock data represents an in-stock status, the correspondent commodity ID data to the sales processing device in response to a specific enter operation. The sales processing device may further include a sales processing unit which executes sales processing of the over-the-counter commodity based on the entered commodity ID data.

Moreover, in the above-described franchise add-on system, the user operation terminal may further include an ID acquisition unit which acquires the commodity ID data attached to the over-the-counter commodities, and the media display unit allows the touch panel to output, in a displayed form, the commodity selection screen corresponded to the acquired commodity ID data.

Moreover, in the above-described franchise add-on system, at least a part of the over-the-counter commodities may include a cigarette pack.

According to the present invention, there is provided a user operation terminal which is the user operation terminal of the franchise add-on system of the present invention, including a media storage unit which stores a hypermedia which makes the user operation terminal output, in a displayed form, a commodity selection screen allowing thereon step-wise selection among the over-the-counter commodities housed in at least the store front stock shelf in response to the enter operation by the ordinary user; a media display unit which makes the touch panel display, in a switchable manner, the stored commodity selection screen of the hypermedia, in response to the enter operation by the ordinary user; and a stock confirmation unit which makes use of the commodity ID data of the over-the-counter commodity selected on the commodity selection screen displayed in a switchable manner, so as to acquire a correspondent store front stock data from the store front stock shelf. The media display unit makes the touch panel display, in a switchable manner, the commodity selection screen presenting “in stock”, if the acquired store front stock data represents an in-stock status.

According to the present invention, there is provided a store front stock shelf which is the store front stock shelf of the franchise add-on system of the present invention, including a stock detection unit which detects a stock status of the over-the-counter commodities housed therein and produces store front stock data.

According to the present invention, there is provided a backyard stock shelf which is the backyard stock shelf of the franchise add-on system of the present invention, including a replenishment detection unit which detects a stock status of the over-the-counter commodities kept therein and produces replenishment stock data.

According to the present invention, there is provided a computer program which is the computer program configured to make the user operation terminal of the present invention, executes a media storage process which stores a hypermedia which outputs, in a displayed form, a commodity selection screen allowing thereon step-wise selection among the over-the-counter commodities housed in at least the store front stock shelf, in response to the enter operation by the ordinary user; a media display process which makes the touch panel display, in a switchable manner, the stored commodity selection screen of the hypermedia in response to the enter operation by the ordinary user; and a stock confirmation process which makes use of the commodity ID data of the over-the-counter commodity selected on the commodity selection screen displayed in a switchable manner, so as to acquire a correspondent store front stock data from the store front stock shelf, the media display process making the touch panel display, in a switchable manner, the commodity selection screen presenting “in stock”, if the acquired store front stock data represents an in-stock status.

Note that the individual constituents of the present invention may be good enough if they are formed so as to express the functions thereof, and may be embodied typically in a form of hardware dedicated to express predetermined functions, in a form of franchise add-on system given a predetermined function by a computer program, in a form of predetermined function embodied on the franchise add-on system by a computer program, in a form of arbitrary combination of these configurations, or the like.

Each of the various constituents of the present invention may not always necessarily be an independent entity, and instead a plurality of constituents may configure a single component, a single constituent may be composed of a plurality of components, a certain constituent may be a part of some other constituent, a part of a certain constituent and a part of some other constituent may overlap, for example.

The hypermedia in the context of the present invention may be good enough if it has image data of a plurality of commodity selection screens which may be displayed in a switchable manner in response to enter operation. This sort of hypermedia may have a part of, or all of movie data, text data, sound data, operational icon and so forth, and allows data structures in which these components are connected by hyperlink.

Accordingly, in the franchise add-on system of the present invention, at least a part of the over-the-counter commodities is stored in the store front stock shelf installed in the vicinity of the sales processing device at the position of cash register, in a freely pickable manner. In addition, the user operation terminal including the touch panel which allows thereon the ordinary user to make enter operation, is installed in the vicinity of the sales processing device at the position of cash register. The stock detection unit of the store front stock shelf detects a stock status of the over-the-counter commodities housed therein and produces store front stock data. The media storage unit of the user operation terminal stores a hypermedia which makes the user operation terminal output, in a displayed form, a commodity selection screen allowing thereon step-wise selection among the over-the-counter commodities housed in at least the store front stock shelf, in response to the enter operation by the ordinary user. In this state, the media display unit makes the touch panel display, in a switchable manner, the stored commodity selection screen of the hypermedia in response to the enter operation by the ordinary user. The stock confirmation unit makes use of the commodity ID data of the over-the-counter commodities selected on the commodity selection screen displayed in a switchable manner, so as to acquire a correspondent store front stock data from the store front stock shelf. The media display unit makes the touch panel display, in a switchable manner, the commodity selection screen presenting “in stock”, if the acquired store front stock data represents an in-stock status. Accordingly, even the over-the-counter commodities, such as cigarette packs disposed at the position of cash register and are therefore not readily accessible by the ordinary users, may be purchased in a simple and quick manner, and thereby the LTV and retention may be improved.

BRIEF DESCRIPTION OF THE DRAWINGS

The above and other objects, features and advantages of the present invention will be more apparent from the following description of a certain preferred embodiment taken in conjunction with the accompanying drawings.

BEST MODE FOR CARRYING OUT THE INVENTION

An embodiment of the present invention will be explained below, referring to the attached drawings. A franchise add-on system 1000 of this embodiment includes, as illustrated in FIG. 1 and FIG. 2, a sales processing device 200 which is installed at a position of cash register SRS in a convenience store CVS as the franchise shop, so as to execute sales processing of cigarette packs STP as the over-the-counter commodities based on a commodity ID data TID attached thereto.

The franchise add-on system 1000 of this embodiment also includes a store front stock shelf 300 installed in the vicinity of the sales processing device 200 at the position of cash register SRS, and houses at least a part of the cigarette packs STP in a freely pickable manner; and a user operation terminal 100 including a touch panel 111 which allows thereon an ordinary user to make enter operation, and installed in the vicinity of the sales processing device 200 at the position of cash register SRS.

Figure 1:
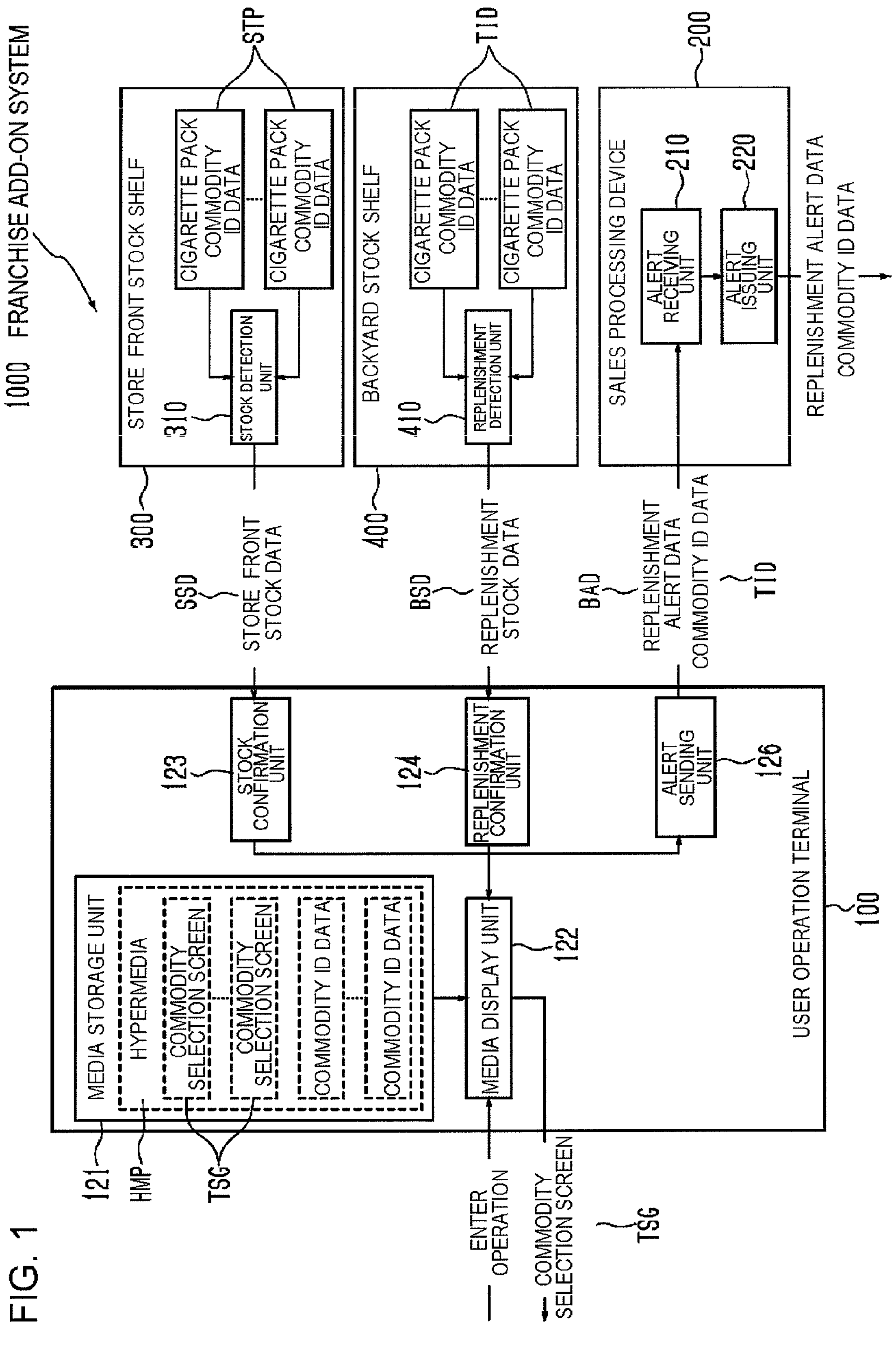
FIG. 1 is a schematic drawing illustrating a logic structure of a franchise add-on system of one embodiment of the present invention.
Figure 2:
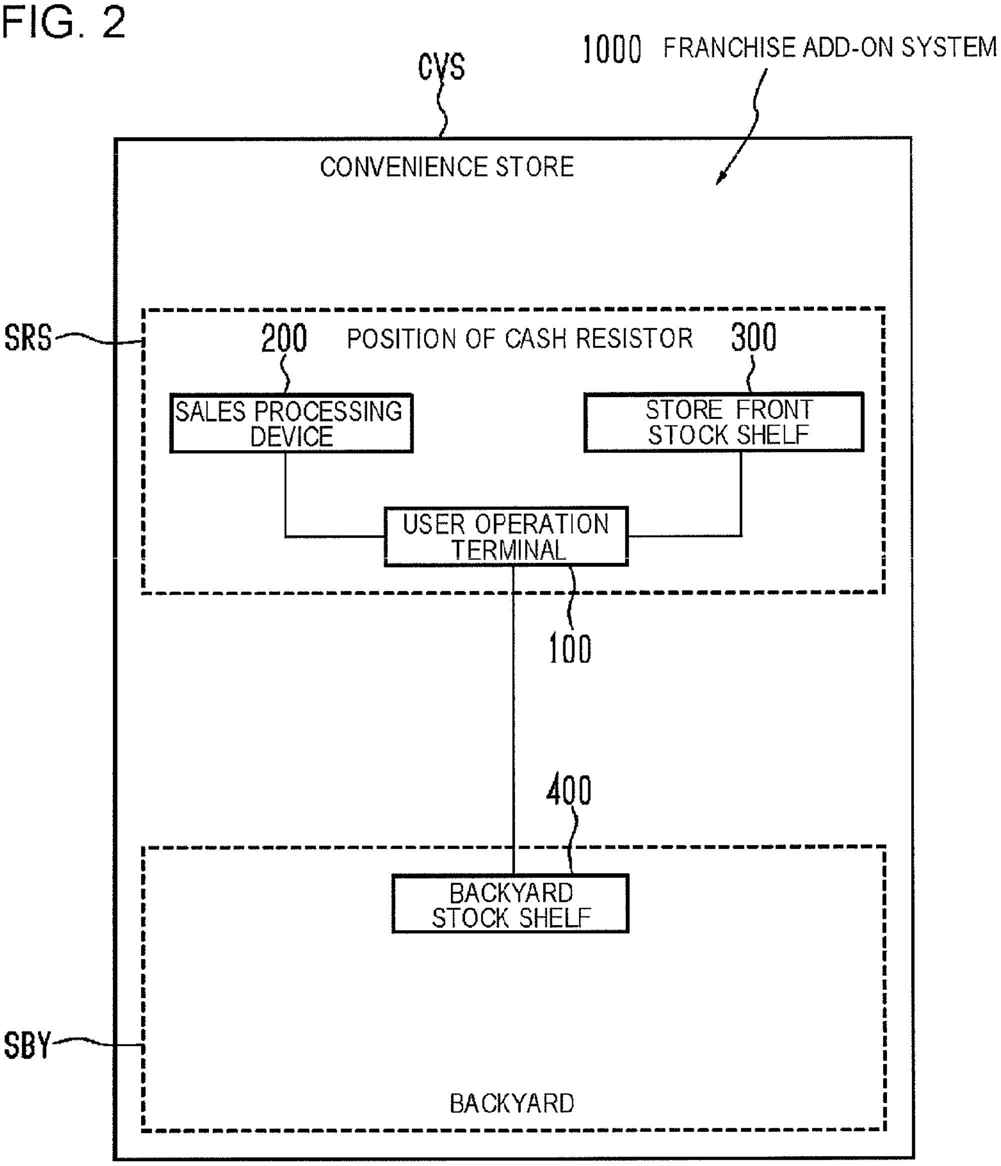
FIG. 2 is a block diagram illustrating a physical structure of the franchise add-on system.

The store front stock shelf 300 includes, as illustrated in FIG. 1, a stock detection unit 310 which detects a stock status of the cigarette packs STP housed therein and produces store front stock data SSD. Details will be given later.

The user operation terminal 100 includes a media storage unit 121 which stores a hypermedia HPM which makes the user operation terminal 100 output, in a displayed form, a commodity selection screen TSG allowing thereon step-wise selection among the cigarette packs STP housed at least in the store front stock shelf 300, in response to the enter operation by the ordinary user; a media display unit 122 which makes the touch panel 111 display, in a switchable manner, the stored commodity selection screen TSG of the hypermedia in response to the enter operation by the ordinary user; and a stock confirmation unit 123 which makes use of the commodity ID data TID of the cigarette packs STP selected on the commodity selection screen TSG displayed in a switchable manner, so as to acquire a correspondent store front stock data SSD from the store front stock shelf 300.

Accordingly, the media display unit 122 of the user operation terminal 100 makes the touch panel 111 display, in a switchable manner, the commodity selection screen TSG presenting "in stock", if the acquired store front stock data represents an in-stock status.

The franchise add-on system 1000 of this embodiment further includes a backyard stock shelf 400 which is installed in a backyard SBY of the convenience store CVS apart from the position of cash register SRS, so as to keep the cigarette packs STP to be replenished to the store front stock shelf 300. The backyard stock shelf 400 includes a replenishment detection unit 410 which detects a stock status of the cigarette packs STP kept therein and may produce replenishment stock data BSD.

Accordingly, the user operation terminal 100 also includes a replenishment confirmation unit 124 which makes use of the commodity ID data TID to acquire a correspondent replenishment stock data BSD from the backyard stock shelf 400, when the acquired store front stock data SSD represents an out-of-stock status.

The media display unit 122 of the user operation terminal 100 then makes the touch panel 111 display, in a switchable manner, the commodity selection screen TSG presenting "out-of-stock", if also the acquired replenishment stock data represents an out-of-stock status.

On the other hand, the media display unit 122 makes the touch panel 111 display, in a switchable manner, the commodity selection screen TSG presenting "in-stock", if the acquired store front stock data SSD represents an out-of-stock status but the replenishment stock data BSD represents an in-stock status.

Moreover, in franchise add-on system 1000 of this embodiment, the user operation terminal 100 includes an alert sending unit 126 which sends the correspondent commodity ID data TID together with a predetermined replenishment alert data BAD to the sales processing device 200, when the store front stock data SSD represents an out-of-stock status, but the replenishment stock data BSD represents an in-stock status.

Accordingly, the sales processing device 200 includes an alert receiving unit 210 which receives the replenishment alert data BAD and the commodity ID data TID, and an alert issuing unit 220 which outputs, in an alert form, the received replenishment alert data BAD and the commodity ID data TID.

Figure 5:
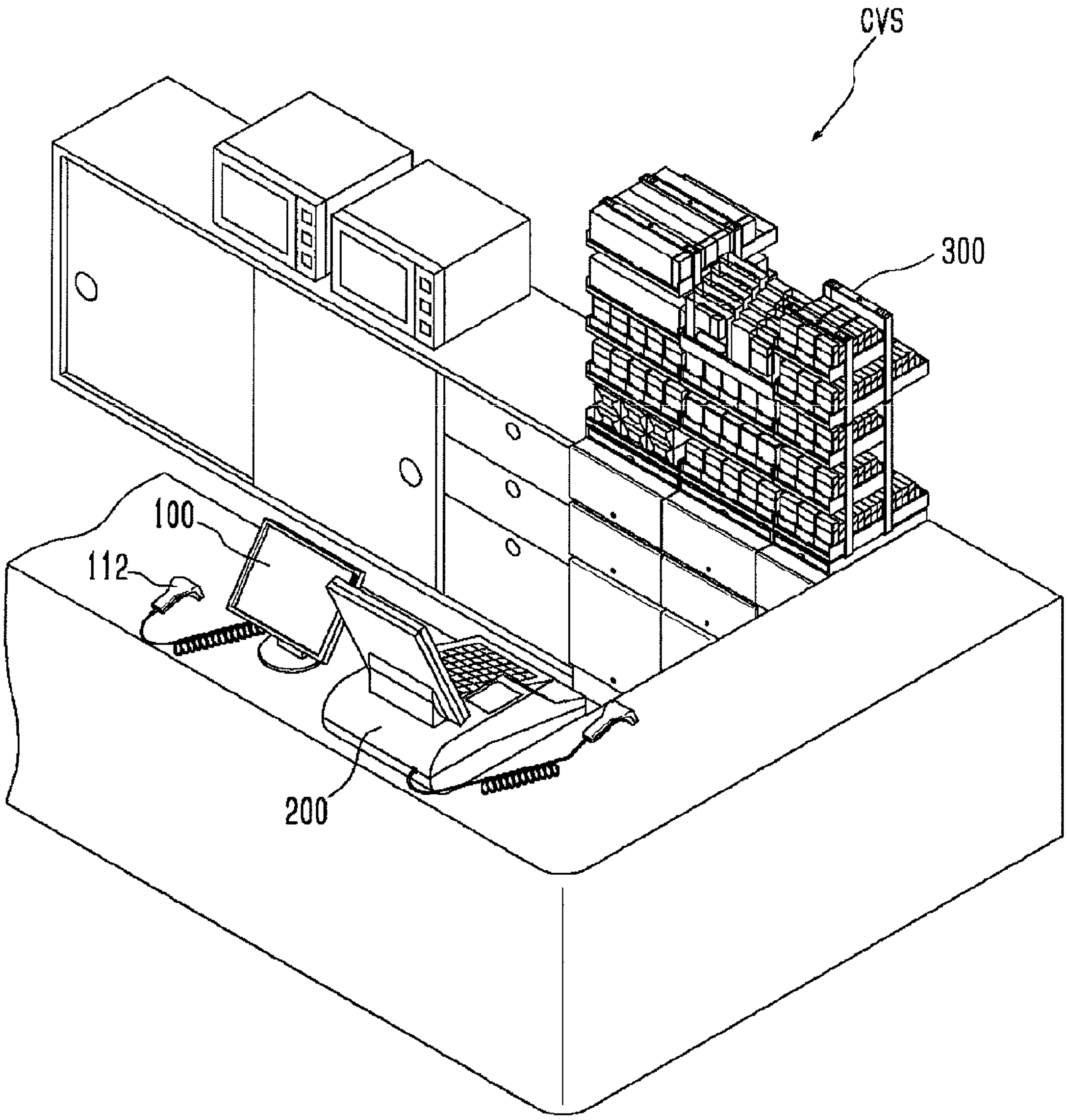
FIG. 5 is a schematic perspective view illustrating an internal layout of a convenience store as a representative of the franchise shop.

More specifically, in the franchise add-on system 1000 of this embodiment, the sales processing device 200 is typically composed of so-called electronic cash register, POS terminal or the like, and at least one of which is installed at the position of cash resistor SRS in the convenience store CVS, as illustrated in FIG. 5.

In the franchise add-on system 1000 of this embodiment, as illustrated in FIG. 2 and FIG. 5, the user operation terminal 100 and the store front stock shelf 300 are installed respectively in the vicinity of the sales processing device 200 at the position of cash resistor SRS in the convenience store CVS.

Figure 6:
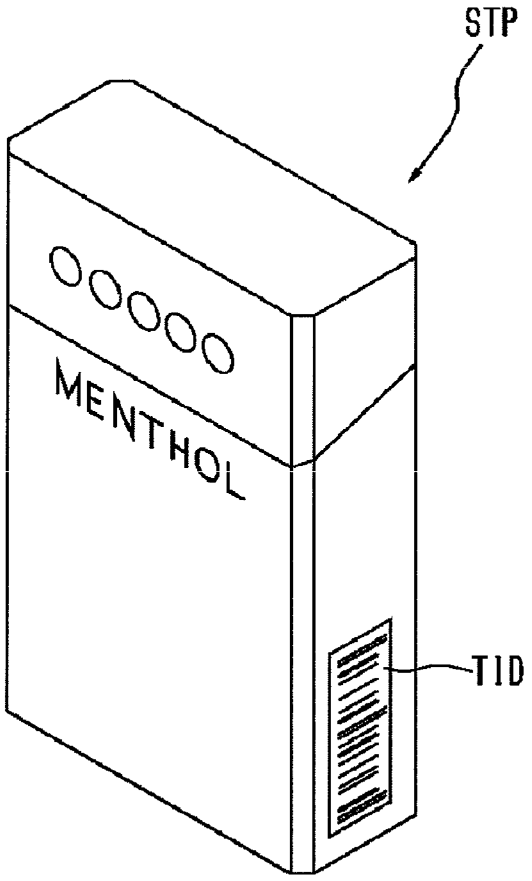
FIG. 6 is a perspective view illustrating an appearance of a cigarette pack as a representative of the over-the-counter commodity.

Each of the cigarette packs STP, which is the over-the-counter commodities to be intended by the franchise add-on system 1000 of this embodiment, has a barcode image attached thereto typically as illustrated in FIG. 6. The commodity ID data TID is recorded as the barcode image.

The cigarette packs STP are commercialized also in a form of cigarette carton (not illustrated). The barcode image is attached also on the cigarette carton, and the commodity ID data TID of the cigarette carton is recorded as the barcode image.

Figure 3:
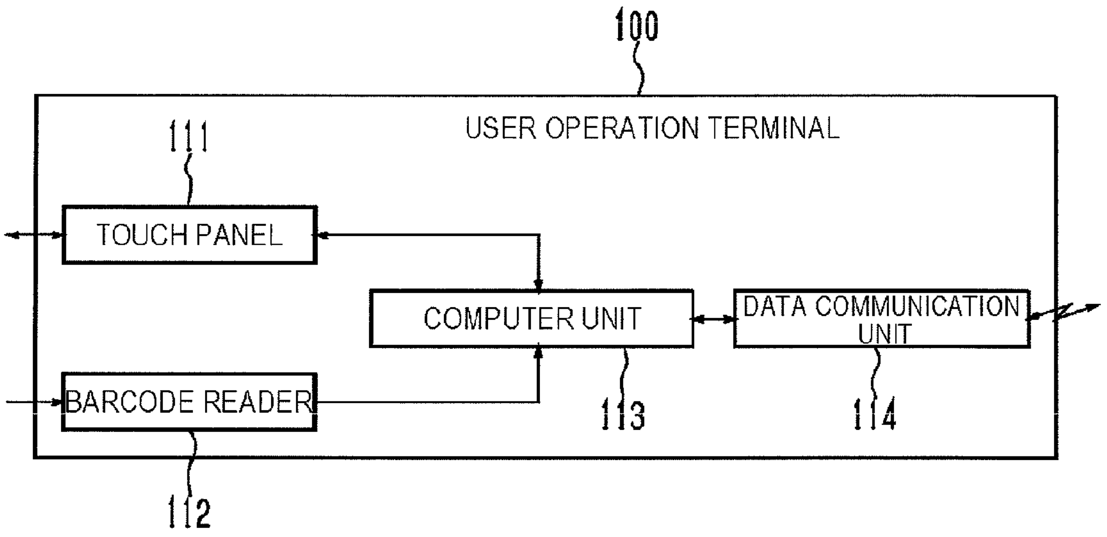
FIG. 3 is a block diagram illustrating a physical structure of a user operation terminal.
Figure 4:
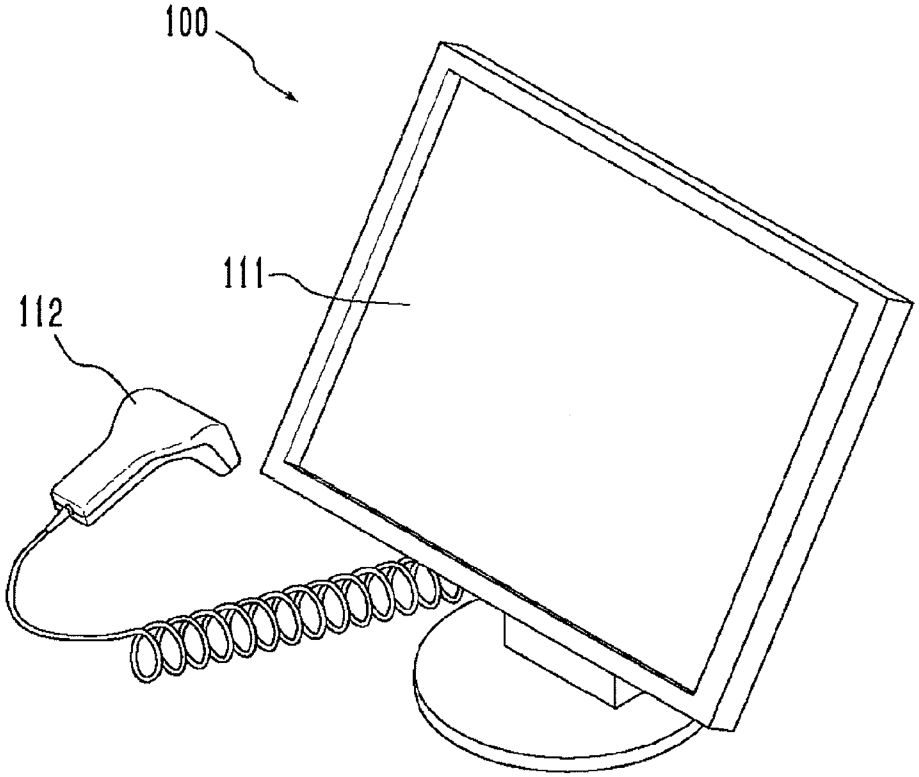
FIG. 4 is a perspective view illustrating an appearance of the user operation terminal.

The user operation terminal 100 of this embodiment has hardware which includes, as illustrated in FIG. 3 and FIG. 4, the touch panel 111 which allows thereon enter operation by the ordinary user, a barcode reader 112 which optically reads the commodity ID data TID from the barcode image attached typically to the cigarette packs STP; and as illustrated in FIG. 2, a computer unit 113 which integrally controls the individual constituents according to a computer program installed thereon, and a data communication unit 114 which executes data communication with the sales processing device 200.

By the integral control of the individual constituents by the computer unit 113 according to the computer program TCP installed thereon, the above-described individual such as the constituent 121 and so forth are logically embodied on the user operation terminal 100.

For example, the media storage unit 121 typically corresponds to a function of the computer unit 113 which recognizes a storage area of a memory device, corresponding to the computer program. The media display unit 122 typically corresponds to a function of the computer unit 113 which integrally controls image display and enter operation on the touch panel 111, corresponding to the computer program.

The stock confirmation unit 123, the replenishment confirmation unit 124, and the alert sending unit 126 correspond to functions of the computer unit 113 which controls operations of data communication by the data communication unit 114, corresponding to the computer program.

Also the store front stock shelf 300 and the backyard stock shelf 400 of this embodiment typically have an optical sensor, a computer unit and a data communication unit respectively mounted thereon (not illustrated).

Accordingly, in the store front stock shelf 300 and the backyard stock shelf 400, the stock detection unit 310 and the replenishment detection unit 410 are respectively embodied by allowing the barcode reader to optically read the commodity ID data TID from the barcode image on the cigarette packs STP housed therein, and by allowing the data communication unit to send it to the user operation terminal 100.

The sales processing device 200 includes a computer unit, a keyboard device, a display device, a loudspeaker device, a barcode reader, a data communication unit, and so forth (not illustrated).

In the sales processing device 200, the alert receiving unit 210 is embodied by allowing the data communication unit to receive the replenishment alert data BAD and the commodity ID data TID from the user operation terminal 100.

The alert issuing unit 220 is embodied by allowing the display device to output, in a displayed form, the received replenishment alert data BAD and the commodity ID data TID, and by allowing the loudspeaker device to output it in a sound form.

A computer program configured for the above-described user operation terminal 100 typically includes a media storing process storing a hypermedia HPM which outputs, in a displayed form, a commodity selection screen TSG allowing thereon step-wise selection among the cigarette packs STP housed in at least the store front stock shelf 300 in response to the enter operation by the ordinary user; a media display process making the touch panel 111 display, in a switchable manner, the commodity selection screen TSG of the hypermedia HPM kept therein in response to the enter operation by the ordinary user; and a stock confirmation process making use of the commodity ID data TID of the cigarette packs STP selected on the commodity selection screen TSG displayed in a switchable manner, so as to acquire a correspondent store front stock data SSD from the store front stock shelf 300. The media display process makes the touch panel 111 display, in a switchable manner, the commodity selection screen TSG presenting "in stock", if the acquired store front stock data SSD represents an in-stock status.

In the above-described configuration, the cigarette packs STP, which are commodities to be sold in the convenience store CVS, may be displayed typically on the store front stock shelf 300 behind the so-called position of shop register SRS typically on a commodity rack as illustrated in FIG. 5, and may not readily be accessible by the ordinary users.

It has therefore been a general practice for the ordinary user who wants to buy the cigarette pack STP to tell a message on desired brand and quantity of cigarette to a shop clerk who stands at the position of cash register SRS, in order to purchase the desired cigarette pack STP.

In this case, since the cigarette pack STP has the commodity ID data TID recorded as the barcode image placed thereon as illustrated in FIG. 6, so that the shop clerk enters the commodity ID data TID by allowing the barcode reader of the sales processing device 200 to optically read the barcode image on the cigarette packs STP.

Then the sales processing of the cigarette pack STP is executed based on the commodity ID data TID, and sales history data SRD is produced. The sales history data SRD is typically sent from the sales processing device 200 at the convenience store CVS to the central management device.

The central management device collects the sales history data from the sales processing devices 200 of a large number of convenience stores CVS as described in the above, so as to utilize them typically in creation of a sales strategy.

In addition, a manufacturer's management device of a commodity-shipping manufacturer acquires the sales history data of the shipped cigarette packs STP from the central management device and manages them, typically based on a contract with the franchise headquarters. Accordingly, also the commodity-shipping manufacturer may use the sales history data in creation of a sales strategy of the cigarette packs STP to be shipped.

It is to be noted herein that, as illustrated in FIG. 5, the franchise add-on system 1000 of this embodiment has the user operation terminal 100 which allows thereon enter operation by the ordinary users, in the vicinity of the sales processing device 200 which allows thereon enter operation by the shop clerk.

For example, the manufacturer's management device described in the above stores the hypermedia HPM which makes the user operation terminal 100 output, in a displayed form, the commodity selection screen TSG allowing thereon step-wise selection of the cigarette packs STP in response to the enter operation by the ordinary user, so as to produce the commodity ID data TID, and supplies the hypermedia HPM to the user operation terminal 100.

Figure 7:
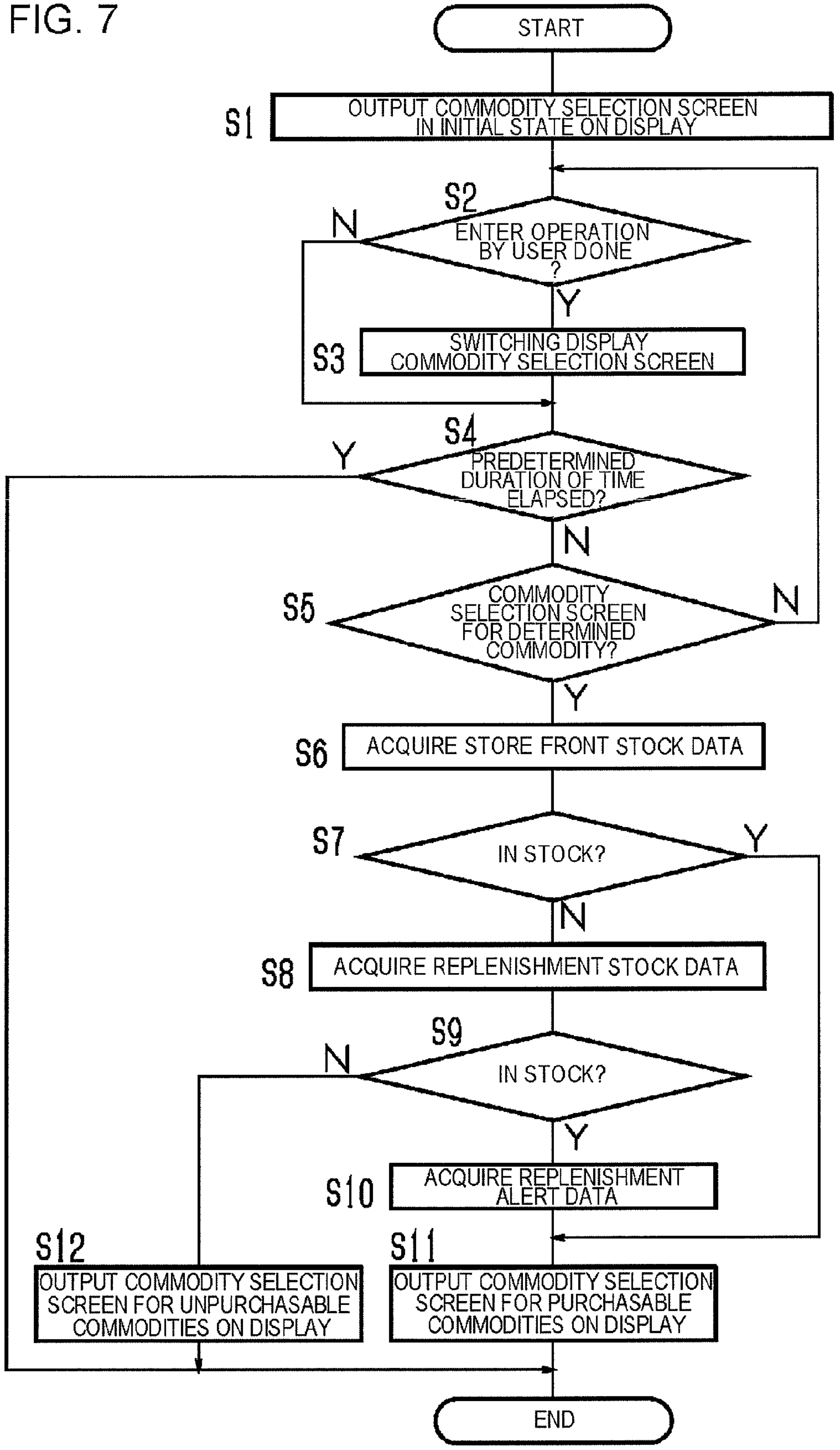
FIG. 7 is a flow chart illustrating a method of data processing in the user operation terminal.

Then, the user operation terminal 100 stores the hypermedia HPM acquired from the manufacturer's management device. As illustrated in FIG. 7, the user operation terminal 100 outputs, in a displayed form, the stored commodity selection screen TSG in the initial state of the hypermedia HPM to the touch panel 111 (step S1).

The commodity selection screen TSG in the initial state typically includes a guidance message such as "Make your choice from the brands below.", and names of major brands such as "cigarette brand A, cigarette brand B, cigarette brand C, . . . " typically in a form of operational icons designed after the appearances of the cigarette packs STP, output thereon in a displayed form (not illustrated).

In addition, a guidance message such as "Or choose a brand of your taste by categories." is output in a displayed form, with operational icons indicating conditions of selection such as "Menthol, Non-Menthol", "Long, Middle, Short", and "Brand New, Best Selling" (not illustrated).

When the ordinary user makes an enter operation according to one's desire on the above-described commodity selection screen TSG (step S2-Y), the commodity selection screen TSG is displayed in a switchable manner, in response to the enter operation (step S3).

Upon selection of the commodity selection screen TSG on which a specific cigarette pack STP is determined by enter operation of the ordinary user (step S5-Y), the user operation terminal 100 then acquires a correspondent store front stock data SSD of the cigarette packs STP from the store front stock shelf 300, using the commodity ID data TID as a search key (step S6).

When the store front stock data SSD represents an in-stock status (step S7-Y), the user operation terminal 100 recognizes an in-stock status, and outputs, in a displayed form, the commodity selection screen TSG which indicates that the commodity is purchasable (step S11). The commodity selection screen TSG in this case will have a guidance message such as "The cigarette in stock now." output thereon in a displayed form (not illustrated).

The ordinary user, who confirmed an in-stock status of one's desired cigarette pack STP on the above-described commodity selection screen TSG, tells one's desire of purchasing the cigarette pack STP to the shop clerk at the position of cash register SRS.

The shop clerk then picks up the cigarette pack STP requested by the ordinary user from the store front stock shelf 300, and executes sales processing typically by allowing the barcode reader of the sales processing device 200 to optically read the barcode image on the cigarette pack STP.

On the other hand, when the store front stock data SSD acquired from the store front stock shelf 300 as described in the above represents an not-in-stock state (step S7-N), the user operation terminal 100 acquires the replenishment stock data BSD from the backyard stock shelf 400 (step S8).

If also the replenishment stock data BSD represents an out-of-stock status (step S9-N), the user operation terminal 100 recognizes an out-of-stock status, and outputs, in a displayed form, the commodity selection screen TSG which indicates that the commodity is not purchasable (step S12). The commodity selection screen TSG in this case will have a guidance message such as "Sorry, the cigarette is out of stock now." output thereon in a displayed form (not illustrated).

On the other hand, if the replenishment stock data BSD represents an in-stock status (step S9-Y), the user operation terminal 100 sends the replenishment alert data BAD together with the commodity ID data TID of the cigarette pack STP to the sales processing device 200 (step S10).

The sales processing device 200 makes the display device output the received replenishment alert data BAD and the commodity ID data TID in a displayed manner, and also makes the loudspeaker device output them in a sound form.

The replenishment alert data BAD and the commodity ID data TID in this case are output typically in such a way that the commodity ID data TID is converted to the name of cigarette pack STP and incorporated into a template message of the replenishment alert data BAD, typically so as to give "Replenish ×× (name of cigarette pack STP) from the backyard stock shelf to the store front stock shelf". The replenishment alert data BAD of this type is output in a form of a flashing display of a window of the guidance message, or in a warning color.

The shop clerk at the position of cash resistor SRS, who confirmed the replenishment alert data BAD and the commodity ID data TID, immediately goes to the backyard SBY, fetches the correspondent cigarette pack STP from the backyard stock shelf 400, and replenish the store front stock shelf 300 at the position of cash register SRS.

The user operation terminal 100 in this case outputs, in a displayed form, the commodity selection screen TSG which indicates that the commodity is purchasable (step S11). The commodity selection screen TSG in this case will have a guidance message typically such as "The cigarette under replenishment. Wait an announce from the shop clerk upon completion of replenishment, please." (not illustrated).

The shop clerk then replenishes the correspondent cigarette pack STP from the backyard stock shelf 400 in the backyard SBY to the store front stock shelf 300 installed at a position of cash register SRS, and tells the ordinary user, making enter operation to the user operation terminal 100, that the cigarette pack STP is replenished.

When the ordinary user who confirmed the in-stock status of the requested cigarette pack STP indicates an order of purchase to the shop clerk at a position of cash register SRS, the shop clerk picks up the cigarette pack STP from the store front stock shelf 300 and executes the sales processing.

If a predetermined duration of time elapses without detecting the enter operation by the ordinary user (step S4-Y), the user operation terminal 100 automatically returns to the initial state where the commodity selection screen TSG in the initial state is output in a displayed form (step S1).

In the franchise add-on system 1000 of this embodiment, the store front stock shelf 300 for housing the cigarette packs STP, and the user operation terminal 100 including the touch panel 111 which allows thereon enter operation by the ordinary user, are installed in the vicinity of the sales processing device 200.

The store front stock shelf 300 detects a stock status of the cigarette packs STP kept therein in a real-time manner, and produces the store front stock data SSD. The user operation terminal 100 stores the hypermedia HPM which makes the user operation terminal 100 output, in a displayed form, a commodity selection screen TSG allowing thereon step-wise selection among the cigarette packs STP in response to the enter operation by the ordinary user, and produces the commodity ID data TID.

The user operation terminal 100 makes the touch panel 111 display, in a switchable manner, the commodity selection screen TSG of the hypermedia HPM in response to the enter operation by the ordinary user, and acquires the correspondent store front stock data SSD from the store front stock shelf 300, based on the commodity ID data TID of the cigarette packs STP selected on the commodity selection screen TSG displayed in a switchable manner.

If the thus-acquired store front stock data SSD represents an in-stock status, the user operation terminal 100 makes the touch panel 111 display the commodity selection screen TSG presenting "in stock" in a switchable manner.

Accordingly, even as for the cigarette packs STP disposed at the position of cash register and are therefore not readily accessible by the ordinary users, a stock status thereof may be taught to the ordinary users in a simple and exact manner. Accordingly, a nonconformity such as offending the ordinary users due to the out-of-stock status may be suppressed, and loss of sales opportunity of the cigarette packs STP, for example, may be avoidable.

Moreover, in the franchise add-on system 1000 of this embodiment, the backyard stock shelf 400 installed in the backyard SBY of the convenience store CVS, apart from the position of cash register SRS, keeps the cigarette packs STP to be replenished to the store front stock shelf 300. The backyard stock shelf 400 therefore detects a stock status of the cigarette packs STP kept therein, and produces the replenishment stock data BSD.

If the acquired store front stock data SSD represents the out-of-stock status, the user operation terminal 100 then acquires the correspondent replenishment stock data BSD based on the commodity ID data TID, from the backyard stock shelf 400.

If also the acquired replenishment stock data BSD again represents the out-of-stock status, the user operation terminal 100 then makes the touch panel 111 display the commodity selection screen TSG presenting "out-of-stock", based on the commodity ID data TID. Accordingly, even for the case where the cigarette packs STP are out of stock neither in the store front stock shelf 300 nor in the backyard stock shelf 400 of the convenience store CVS, the fact may be announced to the ordinary user in a simple and exact manner.

As a consequence, the shop clerk may be prevented from unnecessarily moving to the backyard SBY to find the cigarette packs STP, only for the request of the ordinary users who cannot confirm the stock status. Accordingly, the shop clerk may be prevented from unnecessarily consuming labor or unnecessarily spending one's idle time.

On the other hand, if the acquired store front stock data SSD represents the out-of-stock status, but the replenishment stock data BSD represents the in-stock status, the user operation terminal 100 makes the touch panel 111 display, in a switchable manner, the commodity selection screen TSG presenting "in stock".

The user operation terminal 100 herein sends the correspondent commodity ID data TID together with the predetermined replenishment alert data BAD to the sales processing device 200. The sales processing device 200 outputs, in an alert form, the received replenishment alert data BAD and the commodity ID data TID to the shop clerk.

Accordingly, if the cigarette packs STP requested by the ordinary users are out of stock in the store front stock shelf 300 but in stock in the backyard stock shelf 400, the shop clerk may immediately confirm the status, and may replenish the correspondent cigarette packs STP from the backyard stock shelf 400 to the store front stock shelf 300.

At the same time, the ordinary user may simply and exactly confirm that the requested cigarette pack STP is purchasable, after waiting for only a short time. The cigarette packs STP may therefore be sold without offending the ordinary users.

Moreover, the commodity selection screen TSG of the hypermedia HPM, allowing thereon step-wise selection of the cigarette packs STP in response to the enter operation, is output in a displayed form on the touch panel 111 of the user operation terminal 100. Accordingly, the ordinary user may intuitively select the cigarette packs STP without needing any expertized skill.

In addition, the user operation terminal 100 automatically returns to the initial state, if a predetermined duration of time elapses without detecting the enter operation by the ordinary user. Accordingly, if one ordinary user leave the user operation terminal 100 after completing or interrupting choice of the commodities, the next ordinary user may be acceptable for the enter operation on the user operation terminal 100 without problem.

With the franchise add-on system 1000 of this embodiment, the ordinary user may purchase desired cigarette packs STP without feeling stress, as described in the above. Accordingly, LTV and retention of the cigarette packs STP can be improved.

The present invention is not limited to this embodiment, and allows various modifications without departing from the scope of invention thereof. For example, the above-described embodiment exemplified a case where the sales processing device 200, the store front stock shelf 300, and the backyard stock shelf 400 are connected to the user operation terminal 100, and the user operation terminal 100 executes data communication with the sales processing device 200, the store front stock shelf 300 and the backyard stock shelf 400.

Alternatively, the user operation terminal 100, the sales processing device 200, the store front stock shelf 300, and the backyard stock shelf 400 may be connected to the above-described manufacturer's management device of the commodity-shipping manufacturer, and the user operation terminal 100, the sales processing device 200, the store front stock shelf 300 and the backyard stock shelf 400 may execute data communication via the manufacturer's management device (not illustrated).

The above-described embodiment exemplified a case where the commodity selection screen TSG presenting "out-of-stock" is displayed on the touch panel 111 in a switchable manner, when the both of the store front stock data SSD and the replenishment stock data BSD acquired by the user operation terminal 100 represent the out-of-stock status.

However, the user operation terminal 100 in the above-described case may alternatively make the touch panel 111 display, in a switchable manner, the commodity selection screen TSG recommending a correlated one of the over-the-counter commodities. In this case, the ordinary user may purchase a correlated cigarette pack STP, although one could not purchase the cigarette pack STP of one's first choice. Accordingly, satisfaction of the ordinary users may be improved, and the loss of sales opportunity of the cigarette pack STP may be avoidable.

The above-described embodiment exemplified a case where the user operation terminal 100 has the alert sending unit 126 which sends, if the store front stock data SSD represents an out-of-stock status and the replenishment stock data BSD represents an in-stock status, the correspondent commodity ID data TID together with a predetermined replenishment alert data BAD to the sales processing device 200. However, the above-described alert sending unit 126 may alternatively be installed in the backyard stock shelf 400.

Alternatively, at least either one of the user operation terminal 100 and the backyard stock shelf 400 may have a purchase alert unit which sends, if the replenishment stock data BSD represents an out-of-stock status, the correspondent commodity ID data TID together with a predetermined replenishment alert data to the sales processing device 200, and the sales processing units 200 may have an alert receiving unit 210 which receives the purchase alert data and the commodity ID data TID, and an alert issuing unit 220 which outputs, in an alert form, the received purchase alert data and the commodity ID data TID (not illustrated).

In this case, the out-of-stock status of the cigarette packs STP housed in the backyard stock shelf 400 in the backyard SBY of the shop may immediately be confirmed by the shop clerk who stands at the position of cash resistor SRS, and the shop clerk may immediately execute the purchase.

The above-described embodiment also exemplified a case where the franchise add-on system 1000 includes the user operation terminal 100, the sales processing device 200, the store front stock shelf 300, and the backyard stock shelf 400, wherein the user operation terminal 100 acquires also the replenishment stock data BSD if the acquired store front stock data SSD represents an out-of-stock status, to thereby display the commodity selection screen TSG in a switchable manner.

However, the user operation terminal 100 of the franchise add-on system having no backyard stock shelf 400 (not illustrated) may alternatively display the commodity selection screen TSG, corresponding only with the acquired store front stock data SSD.

In this case, the user operation terminal 100 may typically display the commodity selection screen TSG presenting "in-stock" on the touch panel 111 in a switchable manner, if the acquired store front stock data SSD represents an in-stock status, and may display the commodity selection screen TSG presenting "out-of-stock" on the touch panel 111 in a switchable manner, if the acquired store front stock data SSD represents an out-of-stock status.

The thus-configured user operation terminal 100 may alternatively display, in a switchable manner, the commodity selection screen TSG recommending a correlated one of the cigarette packs STP on the touch panel 111, if the acquired store front stock data SSD represents an out-of-stock status.

The above-described embodiment exemplified a case where the ordinary user orally indicates a request of purchase of the cigarette pack STP, the stock status of which being confirmed on the user operation terminal 100, to the shop clerk at the position of the sales processing device 200.

However, the user operation terminal 100 may alternatively have an ID presenting unit which outputs, if the acquired store front stock data SSD represents an in-stock status, the correspondent commodity ID data TID to the sales processing device 200 in response to a specific enter operation, and the sales processing device 200 may have a sales processing unit which executes sales processing of the cigarette packs STP based on the entered commodity ID data TID (not illustrated).

In this case, the ordinary user may enter the commodity ID data TID to the sales processing device 200, without orally indicating an order of purchase to the shop clerk. Accordingly, even the over-the-counter commodities STP not readily accessible by the ordinary users, such as cigarette packs STP, may be sold in a simple and quick manner, and thereby the sales chance of newly-released products, for example, may be prevented from losing sales opportunities.

The above-described embodiment also exemplified a case where the ordinary user makes the user operation terminal 100 display, in a switchable manner, the commodity selection screen TSG of the hypermedia HPM, only by manual operation. However, for the case where the user operation terminal 100 has the barcode reader 112 as described in the above, the user operation terminal 100 may acquire the commodity ID data TID from the cigarette pack STP using the barcode reader 112 as the ID acquisition unit, and the media display unit 122 may output, in a displayed form, the commodity selection screen TSG correspondent to the acquired commodity ID data TID.

Alternatively, the user terminal may capture an appearance of the cigarette pack STP using a CCD camera (not illustrated), and may produce the commodity ID data TID based on image recognition. Still alternatively, the commodity ID data TID may be acquired by capturing an image of a two-dimensional code on the cigarette pack STP or the like (not illustrated).

The two-dimensional code such as so-called QR code (registered trademark) may ensure storage of a large volume of data only by simple printing. It may therefore be also allowable to preliminarily record the commodity ID data TID of novelty goods such as portable ashtray in the two-dimensional code on the cigarette packs STP, and to make the user operation terminal 100 acquire also the commodity ID data TID of the novelty goods, together with the commodity ID data TID of the cigarette packs STP.

In this case, when the ordinary user sets the two-dimensional code on the cigarette pack STP to the user operation terminal 100, the commodity ID data TID of the free novelty goods is output together with the commodity ID data TID of the cigarette packs STP, from the sales processing device 200 to the shop clerk. Accordingly, the novelty goods may be supplied to the ordinary user who wants to buy the cigarette packs STP, without any special consideration by both of the ordinary user and the shop clerk.

The above-described embodiment dealt with the exemplary case where the handy-type barcode reader 112 is connected via a curl cord to the touch panel 111 of the user operation terminal 100. Alternatively, the barcode reader 112 may be incorporated typically in the front side portion of the touch panel 111 (not illustrated).

Among the over-the-counter commodities, the cigarette packs STP are highly portable and palatable. For this reason, it is highly probable that the ordinary users who want to buy the cigarette packs STP of specific brands already possesses the same brands of cigarette packs STP.

Accordingly, with the user operation terminal 100 as described in the above, the ordinary user, who already has a cigarette pack STP same as that one is going to buy, may display the commodity selection screen TSG of the desired cigarette pack STP in a switchable manner, without needing manual operation on the touch panel 111.

The above-described embodiment exemplified a case where the user operation terminal 100 acquires the store front stock data SSD and the replenishment stock data BSD respectively from the store front stock shelf 300 and the backyard stock shelf 400, while being triggered by enter operation by the ordinary user.

Alternatively, the store front stock shelf 300 and the backyard stock shelf 400 may respectively send the store front stock data SSD and the replenishment stock data BSD to the user operation terminal 100, while being triggered by housing or picking of the cigarette packs STP, and the user operation terminal 100 may store the received store front stock data SSD and the replenishment stock data BSD.

The above-described embodiment dealt with an exemplary case where the user operation terminal 100 makes the touch panel 111, output in a displayed form, the commodity selection screen TSG in the initial state, if a predetermined duration of time elapses without detecting the enter operation.

Alternatively, the user operation terminal 100 may be returned into the initial state after the sales process is executed based on the commodity ID data TID sent from the user operation terminal 100 to the sales processing device 200, and the sales processing device 200 returns the completion of the sales.

The above-described embodiment dealt with the exemplary case where the user operation terminal 100 outputs, in a displayed form, the commodity selection screen TSG of only the cigarette packs STP as the over-the-counter commodity, with the aid of the hypermedia HPM. The franchise add-on system 1000 of the present invention may alternatively be applicable to various over-the-counter commodities selected through enter operation by the ordinary users.

The above-described embodiment dealt with the exemplary case where the user operation terminal 100 produces only the commodity ID data TID of the cigarette packs STP with the aid of the commodity selection screen TSG of the hypermedia HPM. The commodity ID data TID may alternatively be produced by outputting, in a displayed form, the novelty goods such as disposal lighter, portable ashtray, and so forth, together with the cigarette packs STP on the commodity selection screen TSG.

Alternatively, when the ordinary user selects the cigarette packs STP on the commodity selection screen TSG of the hypermedia HPM using the user operation terminal 100, also newly-released cigarette packs STP, other cigarette packs STP including correlated characteristics, cigarette packs STP of the upper grade and so forth, may be output in a displayed form on the commodity selection screen TSG.

In particular, when the ordinary user selects the cigarette packs STP according to the condition of selection on the commodity selection screen TSG as described in the above, the above-described various cigarette packs STP may be recommended to the ordinary user, corresponding to the conditions of selection.

The above-described embodiment exemplified a case where the user operation terminal 100 stores the hypermedia HPM which outputs, in a displayed form, the commodity selection screen TSG allowing thereon step-wise selection among the cigarette packs STP in response to the enter operation by the ordinary user.

Alternatively, the commodity selection screen TSG presenting sales-by-pack and sales-by-carton of the cigarette packs STP may be output in a displayed form, with the aid of the hypermedia HPM stored in the user operation terminal 100.

In this case, the ordinary user may confirm the stock status of the cigarette packs STP and cigarette cartons on the user operation terminal 100, and may therefore execute purchase-by-pack and purchase-by-carton, which is a style of purchase specific to the cigarette packs STP, corresponding to the stock status.

The above-described embodiment exemplified the case where the user operation terminal 100 outputs, in a displayed form, various guidance messages and operational icons on the commodity selection screen TSG of the hypermedia HPM.

However, image of the package of the cigarette pack STP, for example, may be output in a displayed form on the above-described commodity selection screen TSG. In this case, it may be configured typically so that the image of package of the cigarette packs STP is output in a displayed form if the store front stock data SSD or the replenishment stock data BSD represents the in-stock status, but not output in a displayed form in the out-of-stock status.

Still alternatively, the above-described embodiment dealt with the exemplary case where the individual constituents of the user operation terminal 100 and the sales processing device 200 are logically embodied as various functions by the computer program. Each of the individual constituents may alternatively be formed as specific hardware, or as a combination of software and hardware.

It may, of course, be understood that the above-described embodiments and a plurality of modified examples may be combined so far as the contents of which may not be contradictory. Structures of the individual constituents, specifically described in the embodiment and the modified examples, may be modified in various ways so far as the present invention may be satisfied.

The invention claimed is:

1. A franchise add-on system including a sales processing device which is installed at a position of cash register in a franchise shop so as to execute sales processing of over-the-counter commodities by commodity ID (identification) data attached to said over-the-counter commodity, comprising:

a store front stock shelf installed in the vicinity of said sales processing device at said position of cash register, and housing at least a part of said over-the-counter commodities in a freely pickable manner; and a user operation terminal which includes a touch panel allowing thereon enter operation by an ordinary user, and installed in the vicinity of said sales processing device at said position of cash register, said store front stock shelf including a stock detection unit which detects a stock status of said over-the-counter commodities housed therein and produces store front stock data, said user operation terminal including a media storage unit which stores a hypermedia which makes said user operation terminal output, in a displayed form, a commodity selection screen allowing thereon step-wise selection among said over-the-counter commodities housed in at least said store front stock shelf, in response to the enter operation by said ordinary user; a media display unit which makes said touch panel display, in a switchable manner, said stored commodity selection screen in response to the enter operation by said ordinary user; and a stock confirmation unit which makes use of said commodity ID data of said over-the-counter commodity selected on said commodity selection screen displayed in a switchable manner, so as to acquire a correspondent said store front stock data from said store front stock shelf, and said media display unit making said touch panel display, in a switchable manner, said commodity selection screen presenting "in stock", if said acquired store front stock data represents an in-stock status.

2. The franchise add-on system as claimed in claim 1, wherein said media display unit makes said touch panel display, in a switchable manner, said commodity selection screen presenting "out-of-stock", if said acquired store front stock data represents an out-of-stock status.

3. The franchise add-on system as claimed in claim 2, wherein said media display unit makes said touch panel display, in a switchable manner, said commodity selection screen recommending a correlated one of said over-the-counter commodities, if said acquired store front stock data represents an out-of-stock status.

4. The franchise add-on system as claimed in claim 1, wherein said media display unit makes said touch panel display, in a switchable manner, said commodity selection screen recommending a correlated one of said over-the-counter commodities, if said acquired store front stock data represents an out-of-stock status.

5. The franchise add-on system as claimed in claim 1, further comprising a backyard stock shelf which is installed in a backyard of said franchise shop apart from said position of cash register, so as to keep said over-the-counter commodities to be replenished to said store front stock shelf, said backyard stock shelf including a replenishment detection unit which detects a stock status of said over-the-counter commodities kept therein and produces replenishment stock data, wherein said user operation terminal further includes a replenishment confirmation unit which makes use of said commodity ID data to acquire a correspondent said replenishment stock data from said backyard stock shelf, if said acquired store front stock data represents an out-of-stock status, and said media display unit makes said touch panel display, in a switchable manner, said commodity selection screen presenting "out-of-stock", if also said acquired replenishment stock data represents an out-of-stock status.

6. The franchise add-on system as claimed in claim 5, wherein said media display unit makes the touch panel display, in a switchable manner, said commodity selection screen presenting "in-stock", if said acquired store front stock data represents an out-of-stock status and said replenishment stock data represents an in-stock status.

7. The franchise add-on system as claimed in claim 6, wherein said media display unit makes said touch panel display, in a switchable manner, said commodity selection screen recommending a correlated one of said over-the-counter commodities, if both of said acquired store front stock data and said replenishment stock data represent an out-of-stock status.

8. The franchise add-on system as claimed in claim 6, wherein at least either one of said user operation terminal and said backyard stock shelf includes an alert sending unit which sends, if said store front stock data represents an out-of-stock status and said replenishment stock data represents an in-stock status, said correspondent commodity ID data together with a predetermined replenishment alert data to said sales processing device, and said sales processing device includes an alert receiving unit which receives said replenishment alert data and said commodity ID data, and an alert issuing unit which outputs, in an alert form, said received replenishment alert data and said commodity ID data.

9. The franchise add-on system as claimed in claim 5, wherein said media display unit makes said touch panel display, in a switchable manner, said commodity selection screen recommending a correlated one of said over-the-counter commodities, if both of said acquired store front stock data and said replenishment stock data represent an out-of-stock status.

10. The franchise add-on system as claimed in claim 9, wherein at least either one of said user operation terminal and said backyard stock shelf includes an alert sending unit which sends, if said store front stock data represents an out-of-stock status and said replenishment stock data represents an in-stock status, said correspondent commodity ID data together with a predetermined replenishment alert data to said sales processing device, and said sales processing device includes an alert receiving unit which receives said replenishment alert data and said commodity ID data, and an alert issuing unit which outputs, in an alert form, said received replenishment alert data and said commodity ID data.

11. The franchise add-on system as claimed in claim 5, wherein at least either one of said user operation terminal and said backyard stock shelf includes an alert sending unit which sends, if said store front stock data represents an out-of-stock status and said replenishment stock data represents an in-stock status, said correspondent commodity ID data together with a predetermined replenishment alert data to said sales processing device, and said sales processing device includes an alert receiving unit which receives said replenishment alert data and said commodity ID data, and an alert issuing unit which outputs, in an alert form, said received replenishment alert data and said commodity ID data.

12. The franchise add-on system as claimed in claim 5, wherein at least either one of said user operation terminal and said backyard stock shelf includes a purchase alert unit which sends, if said replenishment stock data represents an out-of-stock status, said correspondent commodity ID data together with a predetermined purchase alert data to said sales processing device, and said sales processing device includes an alert receiving unit which receives said purchase alert data and said commodity ID data, and an alert issuing unit which outputs, in an alert form, said received purchase alert data and said commodity ID data.

13. A backyard stock shelf of the franchise add-on system as claimed in claim 4, comprising:

a replenishment detection unit which detects a stock status of said over-the-counter commodities kept therein and produces replenishment stock data.

14. The franchise add-on system as claimed in claim 1, wherein at least either one of said user operation terminal and said backyard stock shelf includes an alert sending unit which sends, if said store front stock data represents an out-of-stock status, said correspondent commodity ID data together with a predetermined replenishment alert data to said sales processing device, and said sales processing device includes an alert receiving unit which receives said replenishment alert data and said commodity ID data, and an alert issuing unit which outputs, in an alert form, said received replenishment alert data and said commodity ID data.

15. The franchise add-on system as claimed in claim 1, wherein said user operation terminal further includes an ID presenting unit which outputs, if said acquired store front stock data represents an in-stock status, said correspondent commodity ID data to said sales processing device in response to a specific enter operation, and said sales processing device further includes a sales processing unit which executes sales processing of said over-the-counter commodity based on said entered commodity ID data.

16. The franchise add-on system as claimed in claim 1, wherein said user operation terminal further includes an ID acquisition unit which acquires said commodity ID data attached to said over-the-counter commodities, and said media display unit allows said touch panel to output, in a displayed form, said commodity selection screen corresponded to said acquired commodity ID data.

17. The franchise add-on system as claimed in claim 1, wherein at least a part of said over-the-counter commodities includes a cigarette pack.

18. A user operation terminal of the franchise add-on system as claimed in claim 1, comprising:

a media storage unit which stores a hypermedia which makes said user operation terminal output, in a displayed form, a commodity selection screen allowing thereon step-wise selection among said over-the-counter commodities housed in at least said store front stock shelf in response to the enter operation by said ordinary user;

a media display unit which makes said touch panel display, in a switchable manner, said stored commodity selection screen of said hypermedia, in response to the enter operation by said ordinary user; and a stock confirmation unit which makes use of said commodity ID data of said over-the-counter commodity selected on said commodity selection screen displayed in a switchable manner, so as to acquire a correspondent said store front stock data from said store front stock shelf, said media display unit making said touch panel display, in a switchable manner, said commodity selection screen presenting “in stock”, if said acquired store front stock data represents an in-stock status.

19. A store front stock shelf of the franchise add-on system as claimed in claim 1, comprising:

a stock detection unit which detects a stock status of said over-the-counter commodities housed therein and produces store front stock data.

* * * * *